UNITED STATES PATENT OFFICE.

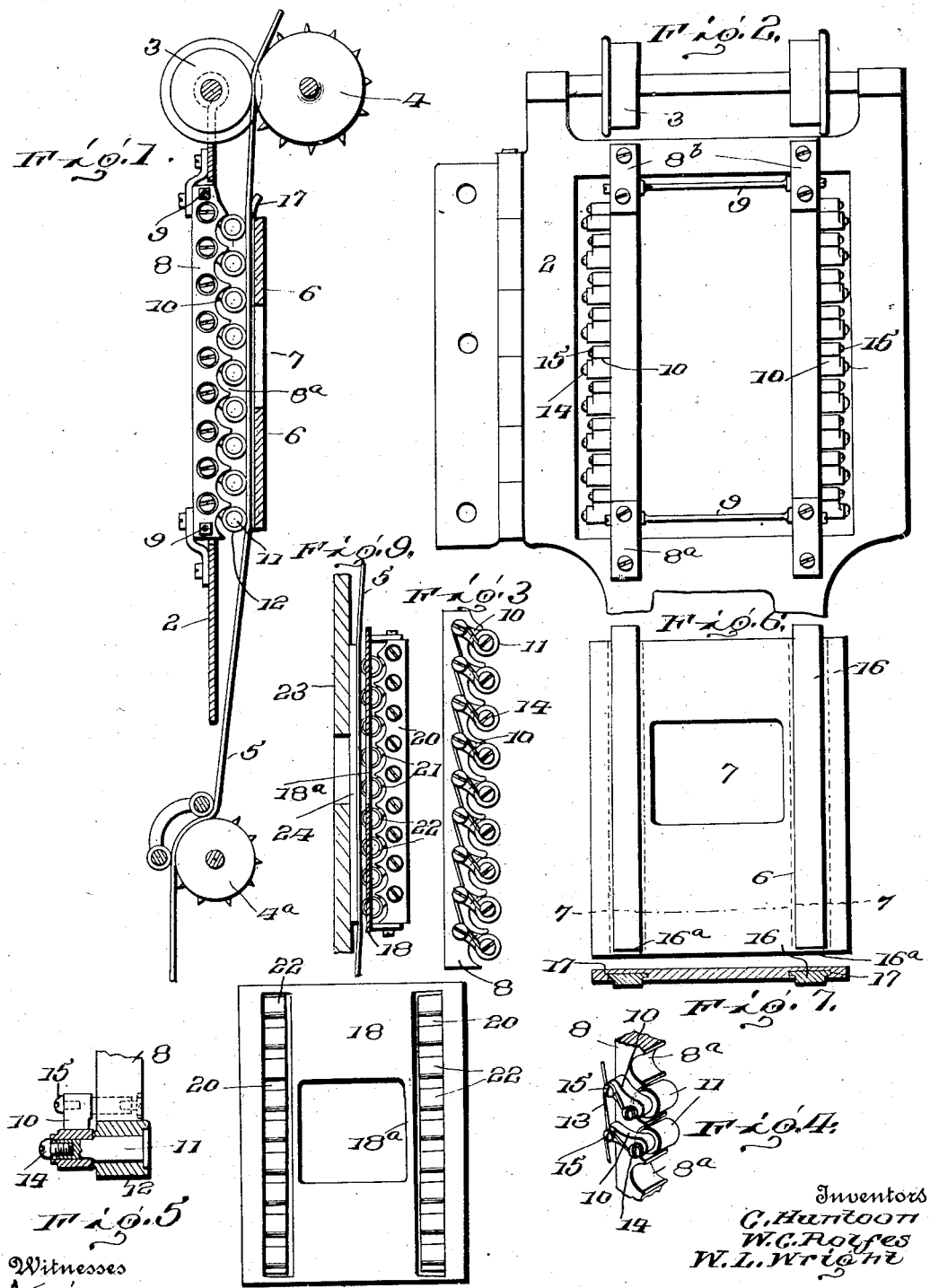

CHARLES HUNTOON, WILLIAM C. ROLFES, AND WALTER L. WRIGHT, OF LOS ANGELES, CALIFORNIA.

FILM-TENSIONING DEVICE FOR MOVING-PICTURE MACHINES.

1,074,177.      Specification of Letters Patent.      Patented Sept. 30, 1913.

Application filed October 31, 1911. Serial No. 657,882.

*To all whom it may concern:*

Be it known that we, CHARLES HUNTOON, WILLIAM C. ROLFES, and WALTER L. WRIGHT, citizens of the United States, residing at Los Angeles, in the county of Los Angeles and State of California, have invented certain new and useful Improvements in Film-Tensioning Devices for Moving - Picture Machines, of which the following is a specification.

Our invention relates to moving picture machines and particularly to means for securing a proper tension of the film as it passes between the gate or door and the aperture plate.

In the photographing or projection of moving pictures, the film upon which the pictures are photographed or from which they are projected is intermittently moved over an opening at great speed. Owing to the quick jerks, there must be applied to the film a brake or tensioning device to cause the film to stop instantly and accurately over the aperture.

In moving picture machinery as at present constructed, the aperture plate is formed with a track or way across which the film moves, and the gate is formed with vertically extending, parallel springs disposed one on each side of the aperture in the gate which, when the gate is closed bear against that side of the film which is coated with emulsion and press the film against the face of the aperture plate. In moving picture cameras the same instrumentalities are used to secure a proper frictional contact on the film as it passes across the plate, only the parts are reversed, the springs being on the aperture plate and forcing the film into frictional contact with the gate. The means above referred to for obtaining this preferable frictional contact or tension with the film are open to a number of objections. The direct contact of the springs with the film subjects the film to great wear and friction, and the strain to which the film is subjected caused by the pressure of these fixed springs and the intermittent shifting of the film tends to tear the film or otherwise damage it. Again, with the tension springs now in use, the emulsion collects on the faces of the springs necessitating shut downs until the emulsion so scraped off has been removed from the springs. This scraping up of the emulsion by the springs checks the sprocket holes on the films and consequently weakens the film. Again, if a spliced or patched film is used with the present type of tension springs, the patch or splice will lift the springs their entire length when the patch reaches a point where the springs extend equally on both sides of the patch, and when the patch is at any point under the springs, the tension varies according to the thickness of the splice or patch so that there will be a jump every time that a patch or splice passes the aperture.

The main object of our invention is to obviate these difficulties by providing tension devices in which film friction is greatly reduced and at the same time the film is held firmly along the greater part of the length of the gate or aperture plate, and by providing a plurality of independent spring actuated, film engaging members to give an even tension at all times, regardless of the thickness of the stock or the condition of the same.

Another object is to provide a supporting plate for the film having removable, replaceable tracks which when worn out may be easily removed and replaced without necessitating the throwing away of the supporting plate.

A further object is to provide film engaging members which bear resiliently against that face of the film which is covered with emulsion, and which being provided with antifriction rollers do not act to scrape off this emulsion or to so frictionally engage the film as to cause it to tear under the intermittent jerks to which it is subjected.

Another object is to so form the tensioning devices that they may be readily applied to various forms of gate and aperture plate to suit various types of machine.

Other objects will appear in the course of the following description.

A form of our invention is illustrated in the accompanying drawings wherein:

Figure 1 is a vertical section of the gate or door of a moving picture machine and the coacting apertured plate, this view also showing a feed mechanism for the film. Fig. 2 is an inside fragmentary face view of the gate or door. Fig. 3 is a side elevation of the roller supporting frame detached from the gate. Fig. 4 is a perspective view of a portion of said frame with two of the rollers in position thereon. Fig. 5 is a fragmentary face view of a portion of the frame, the roller and support therefor being in section. Fig. 6 is an inside face view of the aperture plate shown in section in Fig. 1. Fig. 7 is a transverse section on line 7—7 of Fig. 6. Fig. 8 is a face view of the aperture plate of a motion picture camera. Fig. 9 is a vertical section through the aperture plate and gate of a motion picture camera.

Corresponding and like parts are referred to in the following description and indicated in all the views of the accompanying drawings by the same reference characters.

In the practical operation of our invention any usual or suitable gate and aperture plate may be used. The gate for illustrative purposes is shown as like that form used on a Pathé moving picture machine.

The gate proper is designated 2 and carries at its upper end the tension roller 3 between which and the sprocket wheel 4 the film 5 passes. The gate is of course hinged or otherwise supported in any suitable manner so that it may be swung back out of register with the aperture plate 6. Opposite to the gate 2 when in its closed position is the aperture plate 6 having therein the aperture or window 7. The film is fed downward over the aperture plate and past the window and then passed over any suitable feed mechanism such as the sprocket wheel 4ª. The film is pressed into contact with the aperture plate by means of tension devices carried on the gate. In our invention these tension devices consist of a plurality of independent spring actuated film engaging members disposed on each side of the aperture or window in the gate, and preferably these members consist of a plurality of spring actuated antifriction rollers supported in longitudinal series on each side of the gate aperture. In detail, these rollers are carried on a rectangular frame formed of parallel side bars 8 connected at their opposite ends by spacing bolts 9. This frame is mounted upon the inner face of the gate in any suitable manner, the side bars extending longitudinally of the gate and being attached to the inner face of the gate by any suitable fastening devices. Each side bar is formed on its inner face with a succession of semicircular recesses 8ª and the side bars are attached to the gate by means of the angle clips 8ᵇ.

Pivotally mounted upon the outer side face of each side bar are a plurality of downwardly and inwardly extending arms 10. Through the outer end of each arm as illustrated in Fig. 5 passes a gudgeon 11 upon which rotates an antifriction roller 12. This roller has either the same width as the side bar upon which it is mounted, or is slightly wider than the side bar. As shown in Fig. 4, the arms 10 incline downward or in the direction of travel of the film, and each arm is resiliently urged upward and toward the opposed apertured plate by a spring 13. As illustrated, the spring is attached at one end to the screw 14 which holds the gudgeon in place, then passes up and around a pivot engaging screw 15, then passes down to and engages with the pivot screw of the arm below. We do not, of course, wish to be limited to this detailed construction. It is to be noted that the diameter of each roller is less than the diameter of the semicircular recess in which the roller is received, so that the roller has a certain amount of play. This is plainly apparent in Fig. 3. Each of the antifriction rollers 12 being independently spring actuated, will be forced against the film, and in turn will force the film against the face of the aperture plate but will permit the film to readily shift without friction. Furthermore, as it is these rollers which bear against that face of the film which is covered with emulsion, the emulsion will not be scraped off nor cause the sprocket holes in the film to become checked. Again, as a splice or patch passes over the aperture plate, the independently movable rollers will raise and lower independently to permit the passage of the patch, but the tension devices as a whole will not so raise or lower as do the usual pair of longitudinally extending springs.

To afford a bearing against which the rollers 12 may force the film and to receive the wear of the moving film, we have provided the construction illustrated in Figs. 6 and 7. The aperture plate 6 is of any suitable character or shape, save that it is provided on its face with parallel track members 16 which project slightly beyond the face of the plate and receive the wear of the moving film. Preferably these track members are set into longitudinally extending grooves cut in the face of the apertured plate, and preferably each groove is T-shaped and each track member has lateral flanges 17 which interlock with the T-shaped grooves. The upper ends of the track members are curved away from the film as shown in Fig. 1 so as to permit the easy entrance of the film between the aperture plate and the gate and also to provide a finger hold whereby the track members may be removed when worn. It will be noticed from Fig. 6 that the groove in which the track member is received does not extend down the whole length of the aperture plate, but that it stops short of the lower end of the plate, thus providing an abutment 16ª against which the lower end of the track member 16 rests when in position, this abutment preventing the downward movement of the track member under the action of the film.

The principle of our invention is equally applicable to moving picture cameras as it is to projectors, only in that case the tension devices are disposed upon the aperture plate and act to press the film against the gate instead of the tension devices being on the gate and acting to press the film against the aperture plate. In Figs. 8 and 9 this construction is illustrated. In these figures, 18 designates the aperture plate provided with the usual window 18$^a$. This aperture plate is slotted on each side of the window 18$^a$ as at 19. Mounted upon the rear face of the aperture plate are the parallel bars 20, and pivoted to these bars are the arms 21 carrying at their ends the antifriction rollers 22 which project slightly through the aperture plate as shown in Fig. 9. The gate 23 may be of any suitable construction and is formed on its inside face with the longitudinally extending track members 24 which are preferably constructed in precisely the same manner as the track members 16 previously described. The arms carrying the rollers 22 are, of course, spring actuated. These rollers therefore resiliently bear against the film 5 and act to force the film against the inner face of the gate and particularly against the track members. It will of course be noted that in the camera the film is so placed that the emulsion coated side of the film is toward the aperture plate and hence the necessity of placing the rollers upon the aperture plate rather than upon the gate.

While we have described the detailed construction of our invention, we do not wish to be limited thereto as it is obvious that many changes might be made in the construction without departing from the spirit of the invention. Neither do we wish to be limited to antifriction rollers as other antifriction members might be used to accomplish more or less perfectly the same end It will be seen that in both the projector and the camera we have provided oppositely disposed plates between which the film passes, each of these plates being formed with a window, and that one of these plates is provided with a pair of parallel sets or series of tensioning devices resiliently urged toward the opposite plate, and engaging the film to hold it in contact with the opposed plate, and that the opposed plate in turn is preferably provided with longitudinally extending bearing members disposed on each side of the aperture and against which the film is forced by the tension members.

What we claim is:

1. In a moving picture machine, an aperture plate, independently actuated film engaging members disposed in series on each side of the aperture of said plate, each of said members being independently movable toward or from the plate and each independently and resiliently urged toward said plate.

2. In a moving picture machine, an aperture plate formed with longitudinally extending, parallel tracks on one face and a plurality of independently actuated parallel film engaging members disposed on each side of the aperture of said plate, each member being independently movable toward or from said tracks and each independently and resiliently urged toward said tracks.

3. The combination with oppositely disposed, parallel apertured members spaced from each other for the passage of a photographic film, of a plurality of spring actuated film engaging rollers mounted upon one of said members on each side of the aperture thereof, each of said rollers being independently movable toward or from the opposite member and each of said rollers being independently and resiliently urged toward the other member.

4. In a moving picture machine, parallel apertured members spaced from each other for the passage of a film, a plurality of film engaging members mounted on each side of the aperture of one of said apertured members, each of said film engaging members being independently movable toward and from the opposed apertured member and independently and resiliently urged toward said member, and including, each an antifriction roller mounted thereon.

5. In a moving picture machine, parallel, oppositely disposed apertured members spaced from each other for the passage of a film, a plurality of independent film engaging members carried on one of said apertured members and disposed on each side of the aperture thereof, each of said film engaging members comprising an arm pivotally mounted upon the apertured member, an antifriction roller carried by the free end of said arm, and a spring acting to force the arm outward.

6. In a moving picture machine, parallel, apertured members spaced from each other for the passage of a film, oppositely disposed, parallel bars mounted upon the inner face of one of said apertured members on each side of the aperture thereof, the faces of said bars being formed with a succession of recesses, arms pivoted to the bars and extending outward and in the direction of travel of the film, and antifriction rollers rotatably mounted on the extremities of the arms, and partially housed within said recesses, and springs resiliently urging the arms outward.

7. In a moving picture machine, an aperture plate, a supporting member arranged parallel to the aperture plate and spaced therefrom for the passage of a film between the supporting member and the plate, and a plurality of independently actuated parallel film engaging members mounted upon said supporting member and disposed on each side of the aperture of the plate, each member being independently movable toward or from said plate and each independently and resiliently urged toward said plate.

8. In a moving picture machine, parallel apertured members spaced from each other for the passage of a film, one of said apertured members being formed with longitudinally extending grooves on each side of the aperture, and longitudinally extending tracks fitting said grooves and slidable therein, the other of said members carrying on each side a plurality of independently yielding, outwardly movable, film engaging devices, each independently urged toward said tracks and engaging with the film thereon.

In testimony whereof we affix our signatures in presence of two witnesses.

CHARLES HUNTOON. [L. S.]
WILLIAM C. ROLFES. [L. S.]
WALTER L. WRIGHT. [L. S.]

Witnesses:
CLARENCE W. BYRER,
F. H. SHEPARD.